United States Patent [19]

Hoffman et al.

[11] 4,060,123

[45] Nov. 29, 1977

[54] ENERGY SAVING TEMPERATURE CONTROL APPARATUS

[75] Inventors: Gerald F. Hoffman, Excelsior, Minn.; Dewayne P. Bolton, Memphis, Tenn.

[73] Assignee: Fabri-Tek Incorporated, Minneapolis, Minn.

[21] Appl. No.: 726,977

[22] Filed: Sept. 27, 1976

[51] Int. Cl.$^2$ .................. G05D 23/24; F05B 65/00
[52] U.S. Cl. ............................... 165/11; 70/57; 236/47; 236/51; 340/417; 361/165
[58] Field of Search .................. 236/1 R, 47, 51, 1 C; 165/11; 340/417; 70/57; 361/165; 62/126

[56] References Cited

U.S. PATENT DOCUMENTS

| | | | |
|---|---|---|---|
| 1,597,773 | 8/1926 | Dodge | 236/47 |
| 2,655,806 | 10/1953 | Stiler | 70/57 |
| 3,188,618 | 6/1965 | Rentz | 340/227 |
| 3,352,490 | 11/1967 | Dalzell et al. | 236/68 B |
| 3,729,735 | 4/1973 | Dageford | 340/419 |

Primary Examiner—William E. Wayner
Attorney, Agent, or Firm—Charles E. Golla

[57] ABSTRACT

An improved energy saving control apparatus particularly designed for providing energy saving control of individual room heating and cooling units in direct response to the active occupancy status of the room. Switching means selectively interrupt energization of the load element of a room heating/cooling unit in response to an interrupt control signal. An electronic energy saving control circuit responds to changes in the ambient air room temperature and overrides the heating/cooling unit thermostat to selectively generate the interrupt control signal for maintaining the ambient air room temperature within a broad predetermined and pre-settable energy saving temperature range whenever the room is not actively occupied. Occupancy status detector means, including a uniquely detectable and detachable member typically carried by the room occupant and cooperative detector means within the room provides a real time indication of the active occupancy status of the room. Circuit means responsive to the detected occupancy status overrides the electronic energy saving control circuit whenever the room is actively occupied, causing the heating/cooling unit thermostat to regulate the ambient room air temperature within a narrow settable comfort temperature range.

10 Claims, 4 Drawing Figures

ENERGY SAVING TEMPERATURE CONTROL APPARATUS

BACKGROUND OF THE INVENTION

1. Field of the Invention

This invention relates generally to energy saving apparatus and more particularly to an electronic energy saving override control apparatus for room heating and cooling systems.

2. Description of the Prior Art

Power temperature control devices have long been known in the art for controlling the temperature of a specified enclosed area. Such systems typically employ at least one temperature control sensor or thermostat to provide a power regulating control signal to a primary heating and/or cooling unit, to maintain the controlled temperature within a predetermined temperature comfort range. Traditionally, the predetermined range has varied within several degrees on either side of a median temperature setting which is manually adjustable by an occupant of the temperature controlled area to satisfy that occupant's comfort needs.

It has long been recognized that considerable savings in energy consumed by such heating/cooling units can be achieved by setting the selected temperature to a value which is outside of the normally desired comfort temperature range when the controlled area will be unoccupied or would not require the more accurately controlled temperature range. For example, it is well know that significant energy savings can be achieved for a heating unit if the temperature control setting for the heating unit is set back or down to 60° or 65° F. during the evening hours in which the occupants of the temperature controlled area are normally sleeping. Conversely, energing savings can be achieved with air conditioning units by setting the air conditioning temperature control up or forward to a higher than normal temperature setting (for example to 80° F.) during those extended periods of time during which the temperature controlled area will be unoccupied.

Early such energy saving techniques required the occupant of the temperature controlled area to manually set the thermostat control to the lower or higher energy saving level respectively upon retiring or leaving respectively the temperature controlled area. Mechanized timing devices having integrated clockwork mechanisms were later incorporated into thermostat control devices for automatically setting back temperature settings at predetermined times of the day which were theoretically designed to coincide with the normal sleeping hours of the occupants of the temperature controlled area. Such devices are convenient for use in residential temperature control environments where the daily schedule of the occupants within the temperature controlled area is relatively fixed, but are inflexible, cumbersome and generally unsatisfactory for use in commercial environments such as in hotels and motels having a large number of guest rooms, each having its own independently controlled heating and cooling unit and wherein the guest occupancy conditions are continuously changing.

In attempting to more accurately relate the temperature set back control feature with the active occupancy of the temperature controlled area, later temperature set back control devices were configured which operated in response to the ambient illumination level within the temperature controlled area. Such devices typically provided normal comfort control signals to the primary heating unit of the room as long as the illumination intensity of the controlled area was maintained above a predetermined threshold level, typically satisfied by illumination through the windows during daylight hours and by electric lighting during evening hours. Such devices operate on the implied assumption that the occupant of the controlled area will maintain a certain predetermined threshold of illumination within the room during his waking hours. Such devices, however, have no provision for regulating the temperature within the temperature controlled area at a non-comfort setting during the daylight hours of a day if, for example, the temperature controlled area were to remain unoccupied for extended periods of time during the daylight hours, as is typically the case in hotel and motel guest rooms. Also, if the room occupant were to leave a light on within the controlled area after leaving the area, the temperature control device would maintain the higher energy consuming comfort level of the controlled area during the evening hours even though the room was unoccupied. Further, such temperature set back control devices are typically inappropriate for use as energy saving devices with air conditioning units since they would require the occupant of a controlled area to maintain a light in an illuminating mode of operation within the controlled area while he were asleep, if he desired the air conditioning unit to maintain the preset comfort temperature level during the evening hours.

The present invention overcomes the shortcomings and deficiencies of the prior art temperature set back control devices by providing a simple, efficient, flexible and highly reliable energy saving control apparatus particularly suitable for application in combination with individual room heating and cooling units such as used in hotels and motels. The energy saving control apparatus of this invention is adaptable to use with any thermostat controlled heating and/or cooling unit and responds to a positive input signal applied by the occupant of the room, in a manner which assures operation of the heating/cooling unit of the controlled area within the normal comfort temperature range while the occupant is within the temperature controlled area, but maximizes energy saving operation of the heating/cooling unit whenever the occupant is not within the temperature controlled area.

SUMMARY OF THE INVENTION

The present invention comprises an electronic energy saving temperature control means suitable for use in combination with heater/ventilator/air conditioning units used for controlling the temperature within an enclosed area, and particularly for use with such heater/ventilator/air conditioning units of the type used to provide personalized air temperature control within individual guest rooms of hotels and motels. Such heater/ventilator/air conditioning units are of the type characterized by a load comprising a fan, air conditioner compressor and/or heater element, and a temperature control unit suitable for normally regulating the load energization to maintain the ambient room temperature within a predetermined comfort range of degrees.

The electronic energy saving temperature control means includes line switching means readily connectable to pre-installed heater/ventilator/air conditioning units for selectively preventing, in response to an interrupt control signal, energization of the heater/ventilator/air conditioning load. The line switching means is configured for installation within the chassis of the heater/ventilator/air conditioning unit within the controlled room and is operatively connected to receive the interrupt control signal from an electronic energy saving control circuit sized for mounting at a remote location within the room. The electronic energy saving control circuit is mounted within a portable chassis suitable for convenient placement on a wall or preferably for resting engagement on a surface such as a desk or table at a convenient location within the room and, is energized by means of readily available power within the room. The electronic energy saving control circuit includes an electronic temperature sensing circuit configured to monitor the ambient temperature within the room and selectively provides an interrupt control signal to the line switching means in response thereto. The electronic energy saving control unit is operative to normally enable uninterrupted operation of the heater/ventilator/air conditioning unit whenever the monitored ambient air temperature in the room is outside of a predetermined energy saving temperature range, and is operable to prevent active energization of the heater/ventilator/air conditioning load, by means of the interrupt control signal, whenever the monitored ambient air temperature in the room is within the predetermined energy saving temperature range. The predetermined energy saving temperature range comprises a presettable consecutive number of temperature degrees which typically overlaps and encompasses the normal comfort range of temperatures. A typical energy saving temperature range for hotel and motel room applications of the system could include temperatures from 50° to 90° F.; however, it will be understood that many other energy saving temperature ranges would apply within the spirit and intent of this invention.

The electronic energy saving control circuit is normally operable in a first mode, as above described, to override the normal control function of the temperature control unit or thermostat of the heater/ventilator/air conditioning unit whenever the ambient air temperature is within the energy saving temperature range. In practice, the electronic energy saving control circuit would be operative in its first mode of operation when the room in which the control circuit is installed is currently unoccupied. An occupancy detector apparatus, preferably forming a part of the chassis housing the electronic energy saving control circuit, provides a real time output indication of the occupancy status of the room. The occupancy detector apparatus includes a receptor station for receiving an appropriately configured or encoded entry from the room occupant upon his entry into the room. The occupancy detector apparatus is preferably configured to recognize the insertion therein of a uniquely detectable member such as a guest room key, a magnetic identification card or the like, which uniquely detectable member is typically always carried by the room occupant when he is not in his assigned room. A detector circuit within the occupancy detector apparatus recognizes an appropriate entry into the receptor station and provides a deactivating or inhibiting signal to the electronic energy saving control circuit, causing the control circuit to become operable in a second mode of operation for as long as the proper detectable entry remains within the receptor station of the occupancy detector apparatus. When operable in its second mode of operation, indicating that the room is currently actively occupied by a registered guest, the energy saving control circuit is prohibited from forwarding an interrupt control signal to the heater/ventilator/air conditioning unit, thus enabling the heater/ventilator/air conditioning unit to operate under normal control of its temperature control unit or thermostat, to produce ambient room temperatures within the comfort temperature range selectable by the room occupant. Upon leaving his room, the room occupant removes his room key or other uniquely detectable member from the receptor station of the occupancy detector apparatus, the electronic energy saving control circuit for activation in its first mode of operation, reestablishing control of the heater/ventiltor/air conditioning unit thereof for providing temperature control of the room within the broad energy saving temperature range as long as the room remains unoccupied.

While a preferred embodiment of an electronic energy saving control circuit will be described, it will be understood that other appropriate circuits which accomplish the same purposes could equally well be employed within the spirit and intent of this invention. Further, while a particular energization status of the respective control circuits will be described with respect to the preferred embodiment networks, it will be understood that the logical networks could equally well be energized in their complimentary logical energization states and still provide the requisite novel features of this invention. Further, while a preferred configuration of a desk console chassis housing the electronic energy saving control circuit and occupancy detector apparatus will be disclosed with respect to the preferred embodiment, it will be understood that other appropriate configurations could equally well be employed. Also, while a particular occupancy detector apparatus and uniquely detectable activating member will be described for the preferred embodiment application of the invention, it will be understood that other such positively activated detector mechanisms can be employed within the spirit and intent of this invention. It will also be understood that while the invention will be described for controlling self-contained heater/ventilator/air conditioning units, that the invention also applies to the control of room fan-coil units which are connected via hot and cold water lines to centrally located heat exchangers and boiler units. These and other variations of the invention and various portions thereof will become apparent to those skilled in the art upon a more detailed description of the preferred embodiment and drawings.

BRIEF DESCRIPTION OF THE DRAWING

Referring to the Drawing, wherein like numerals represent like parts throughout the several views.

DESCRIPTION OF THE PREFERRED EMBODIMENT

Figure 1:
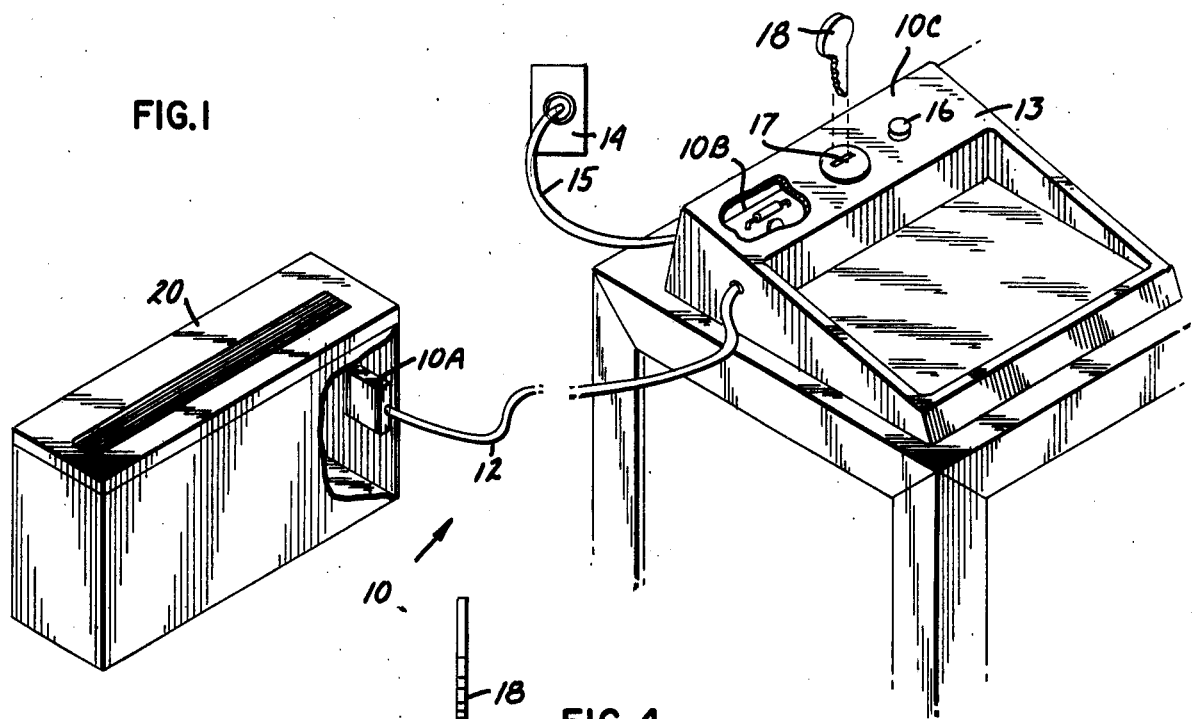
FIG. 1 is a diagrammatic view of a preferred embodiment configuration of an electronic energy saving temperature control means constructed according to the principles of this invention.
Figure 2:
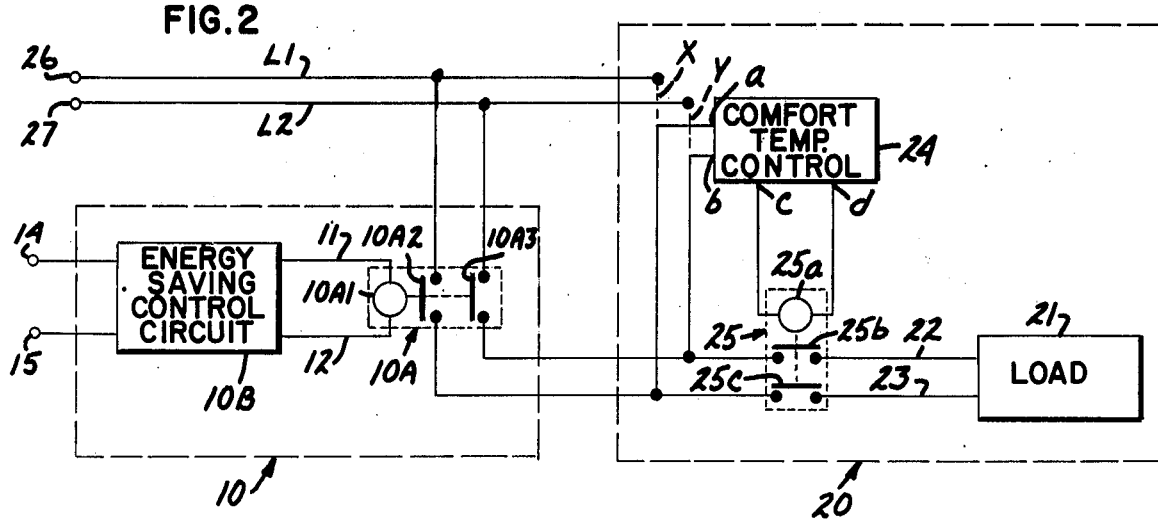
FIG. 2 is a block diagram representation of the electronic energy saving temperature control means of this invention illustrated as it would appear in combination with the functional blocks of a typical heater/ventilator/air conditioning unit.

Referring to the figures, there is generally illustrated in 10, in FIG. 1, an electronic guest room energy saving control means particularly configured for use in combination with a self-contained heating/cooling unit particularly configured for controlling the ambient air temperature within a room such as a guest room within a hotel or motel. The heating/cooling unit 20 could comprise either a heating or a cooling unit per se, but would typically comprise a combined heating/ventilating/air conditioning unit for providing year-round control of the ambient air temperature within the room or could comprise a fan-coil type of unit receiving heated or chilled water from water lines connected to remotely located heat exchanger units (i.e. from refrigeration or boiler units). A block diagram illustration of a typical heating/cooling unit 20 is illustrated in FIG. 2. Referring thereto, the heating/cooling unit 20 includes a fan, an air conditioner compressor and a heater coil, all collectively indicated as the load 21 in FIG. 2. The load 21 is energized by means of a pair of power buss conductors 22 and 23. A temperature control unit or thermostat 24 operatively controls energization of the load elements 21 by means of a relay 25 or other appropriate switching means. The temperature control unit or thermostat 24 has a pair of input supply terminals 24a and 24b and a pair of signal output terminals 24c and 24d, and may be of any type or temperature control apparatus well known in the art which is suitable for monitoring the ambient air temperature within the controlled enviroment (guest room in the preferred embodiment) and for providing a regulating output control signal at its output terminals 24c and 24d for energizing the appropriate load elements 21 so as to maintain the ambient air temperature of the room within a predetermined "comfort temperature range" of degrees. The temperature control thermostat 24 typically has a manually settable indicator (not illustrated) with which the room occupant can select that temperature setting which is most comfortable to him, and the temperature control thermostat 24 will typically control energization of the load 21 to maintain the ambient air temperature within the room within a range extending from several degrees below the selected temperature to several degrees above the selected temperature, providing an operative hysterisis range about the selected temperature setting to prevent repetitive energization/de-energization cycling of the load 21.

The temperature control unit 24 would also typically include a selector switch (not illustrated) for designating which of the multiple load elements 21 (i.e. the fan, the air conditioner or the heater elements) is to be controlled thereby at any one period of time. The output switching relay 25 controlled by the temperature control unit 24 includes an energizing coil 25a and a pair of normally open relay contacts 25b and 25c, each cooperatively moveable to provide an electrical closure circuit between an associated pair of stationary contact elements.

The heating/cooling unit 20 is typically energized by means of a 60 Hertz AC supply represented by the input supply terminals 26 and 27 in FIG. 2. The load supply is typically of high voltage ranging from 208-265 volts, depending upon the particular installation. In normal operation, without the electronic guest room energy saving means 10 of this invention, the heating/cooling unit 20 is typically directly connected to the load supply terminals 26 and 27 by means of a pair of load supply buss conductors L1 and L2, as illustrated by the dashed line connections at x and y respectively in FIG. 2. Controlled interruption of the load supply power from the load supply buss lines L1 and L2 to the load elements 21 is provided by means of the first and second movable contacts 25b and 25c respectively of the control relay 25. In typical applications, the temperature control unit 24 is also directly connected for energization from the load supply terminals 26 and 27, and includes any required voltage protection circuits (not illustrated) for protecting lower voltage circuit of the temperature control unit 24 from the higher input voltages. It will be noted that the temperature control unit is operative to energize the relay coil 25a, causing the movable relay contacts 25b and 25c to electrically close the energization path to the selected load elements 21 whenever the ambient air temperature monitored thereby falls outside of the predetermined comfort temperature range.

The guest room energy saving apparatus 10 basically comprises an appropriate line switching means 10A, an electronic energy saving control circuit means 10B, and a positively activated room occupancy status detector means 10C.

The line switching means 10A comprises in the preferred embodiment a relay having a energizing coil 10A1 and a pair of movable contact elements 10A2 and 10A3 respectively cooperatively movable relative to two pairs of stationary contacts to open and close the electrical circuit path respectively therebetween. In the preferred embodiment, the relay contacts 10A2 and 10A3 are normally open and are operative to electrically close the circuit path between their associated stationary contacts upon de-energization of the relay coil 10A1. It will be understood that while a mechanical relay has been illustrated in the preferred embodiment application, the line switching means 10A could equally well comprise a solid state switch such as a triac or back-to-back silicon controlled rectifiers, or other appropriate switching means suitable for selectively interrupting and applying the high-voltage energizing power from the load supply terminals 26 and 27 to the heating/cooling unit 20.

The line switching relay 10A is configured for mounting directly within the chassis of the heating/cooling unit 20 (see FIG. 1) and is operatively connected such that one or both of its movable contact elements are connected in series between the load supply terminals 26 and 27 and the input supply lines 22 and 23 to the heating/cooling unit load 21. One possible operative connection of the switching means 10A for accomplishing this purpose is illustrated in FIG. 2. Referring thereto, it will be noted that the relay 10A has been connected in series with and in a manner so as to directly control the energizing power from the load supply terminal 26 and 27 to both the temperature control unit 24 and the load 21 of the heating/cooling unit 20. It will be recognized that the important function of the line switching means 10A is to control energization of the load 21 and to override the effect of any attempted load energizing signals from the temperature control unit 24. Accordingly, as long as the switching means 10A effectively interrupts the signal flow path to the load 21, it would not be necessary to directly interrupt power to the temperature control unit 24 as illustrated. Similarly, it would not be necessary to interrupt signal flow along both of the energizing buss lines to the load 21; it would suffice to interrupt only one of the energizing buss lines to the load 21 to prevent a completed energization path to the load 21. These and other variations of the line switching means 10A operative connection to the heating/cooling unit 20 will be readily perceived by those skilled in the art. The relay coil 10A1 of the relay 10A is energized by means of a pair of conductors 11 and 12 leading to a pair of signal output terminals (to be hereinafter described) of the energy saving control circuit 10B. For ease of detachability of the conductors 11 and 12 from the relay 10A, a detachable connector (not illustrated) may be employed at the relay 10A to detachably matingly accept the energizing conductors 11 and 12.

Figure 4:
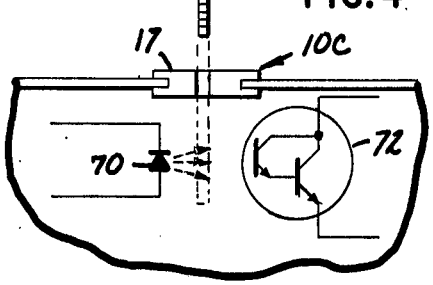
FIG. 4 is an enlarged diagrammatic illustration of the occupancy detector apparatus portion of the electronic energy saving temperature control means of the present invention disclosed in FIGS. 1 and 3.

The energy saving control circuit 10B and the room occupancy status detector assembly 10C are mounted in the preferred embodiment within a portable desk chassis 13, configured in the preferred embodiment in the form of a desk valet for holding various items. The desk unit 13 is highly portable and can be readily moved about the room as is convenient for the hotel or motel staff or the room occupant. The only connection required to the desk unit 13 are the energizing conductors 11 and 12 leading from the energy saving control circuit 10B to the switching relay 10A and a pair of power energizing lines 14 and 15 employed for energizing the electronics of the energy saving control circuit 10B and adapted for connection to any appropriate power source and preferably to a standard AC wall outlet within the room. As will become apparent upon a more detailed description of the energy saving control circuit 10B, while a desk unit 13 is illustrated for housing the control circuits 10B and the occupancy detector apparatus 10C, this configuration was chosen merely for its convenience in the preferred embodiment application of the system; it will be readily understood that other configurations of the chassis 13, including configurations suitable for either permanent or temporary mounting to a wall of the room also are covered by the broad scope of this invention. Besides the convenient article holding valet configuration of the desk unit 13, the unit also includes in the preferred embodiment, an indicator lamp display 16 for indicating the operative status of the energy saving control circuit 10B and a receptor station or channel 17 for cooperatively accepting a uniquely configured or identifiably encoded detectable member. In the preferred embodiment, the receptor station or channel 17 is sized to cooperatively matingly accept a guest room key 18 therein, as illustrated in more detail in FIG. 4. As will become more apparent upon a more detailed description of the occupancy detector apparatus, the detectable member 18 could comprise any appropriate item such as the desk room key, a tag normally attached to the guest room key which includes some property uniquely detectable by the detection circuitry, or other apparatus of similar nature; it is desirable, however, for the detectable member to be of a nature (such as the guest room key) which would be typically carried by the room occupant whenever the occupant leaves the room in which the energy saving control apparatus is installed. Besides being of a configuration or shape which is uniquely detectable or accepted by the receptor channel 17, the detectable member 18 could be constructed partially or in whole of a material which would readily lend itself to unique detectability (such as a magnetic material which would lend itself to magnetic sensing by appropriate detector apparatus, to be hereinafter described).

Figure 3:
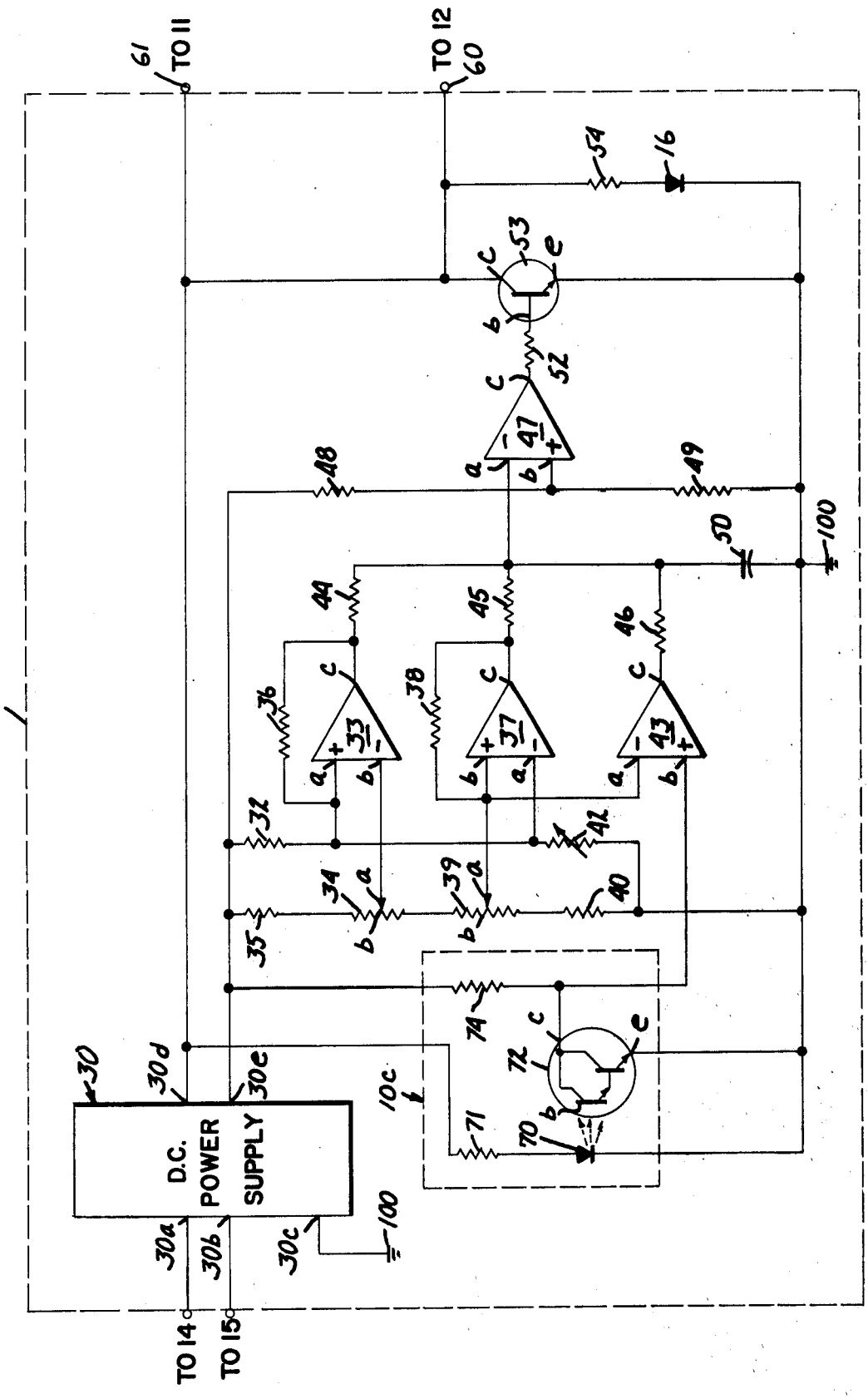
FIG. 3 is an electrical schematic diagram of the circuits comprising the electronic energy saving temperature control means of the present invention disclosed in FIG. 2.

The energy saving control circuit 10B of the preferred embodiment is schematically illustrated in more detail in FIG. 3. Referring thereto, the conductors 14 and 15 leading to a 115 volt AC supply within the room, are directly connected to first and second input terminals 30a and 30b of a DC power supply functional block 30. The DC power supply further has a common or reference input terminal 30c, a first signal output terminal 30d and a second signal output terminal 30e. The reference input terminal 30c of the power supply 30 is directly connected to a common or reference buss 100. The DC power supply 30 may comprise any appropriate supply network operable to convert received AC input signals supplied to the input terminals 30a and 30b, to DC output signals of appropriate voltage levels for energizing the respective electrical circuits within the electronic energy saving control circuit means 10B. In the preferred embodiment, the DC power supply 30 is operable to provide a DC output signal of 24 volts at its signal output terminal 30d, and is operable to provide a DC output signal of 12 volts at its output terminal 30e. Throughout the remainder of this description it will be understood that those electrical circuits described which apparently require connection to a power supply source, but where such connection is not physically illustrated in the figures, are operatively connected for energization to the appropriate signal output terminal 30d or 30e of the DC power supply 30 and are commonly connected to the reference terminal 100.

The signal output terminal 30e of the DC power supply 30 is connected by means of a resistor 32 to a noninverting input terminal 33a of an operational amplifier 33. The operational amplifier 33 further has an inverting signal input terminal 33b and a signal output terminal 33c. The operational amplifier 33 is in the preferred embodiment of a type LM 324, but could comprise any appropriate operational amplifier suitable for use as a comparator. As previously mentioned, it will be understood that the operational amplifier 33 and all other such amplifiers described throughout the specification are appropriately connected for energization to the 12 volt DC supply output terminal 30e and to the common reference buss 100.

The inverting signal input terminal 33b of the operational amplifier 33 is directly connected to the slider element 34a of a potentiometer 34. The potentiometer 34 further has a resistive element 34b which is connected to the signal output terminal 30e of the DC power supply 30 by means of a resistor 35. The signal output terminal 30c of the operational amplifier 33 is connected by means of a feedback resistor 36 to the non-inverting input terminal 33a of the operational amplifier 33.

The 12 volt signal output terminal 30e of the power supply 30 is also connected by means of the resistor 32 to the inverting input terminal 37a of an operational amplifier 37. The operational amplifier 37 is in the preferred embodiment also of a type LM 324, further having a non-inverting input terminal 37b and a signal output terminal 37c. The signal output terminal 37c of the operational amplifier 37 is operatively connected by means of a feedback resistor 38 to the non-inverting input terminal 37b of the amplifier 37. The non-inverting signal input terminal 37b of the amplifier 37 is also connected directly to the slider element 39a of a potentiometer 39. The potentiometer 39 further has a resistive element 39b which is connected in series with the potentiometer 34 and a resistor 35 to the 12 volt output terminal 30e of the DC power supply 30. The resistor 35 and the potentiometers 34 and 39 are also connected in series with a resistor 40 to the common reference buss 100. The inverting input terminal 37a of the operational amplifier 37 is also connected by means of a thermistor 42 to the common reference buss 100.

The non-inverting input terminal 37b of the operational amplifier 37 is further directly connected to an inverting input terminal 43a of a third operational amplifier 43. The operational amplifier 43 is in the preferred embodiment a type LM 324 and further has a non-inverting input terminal 43b and a signal output terminal 43c. The signal output terminals 33c, 37c and 43c of the operational amplifiers 33, 37 and 43 respectively are respectively connected by means of resistors 44, 45 and 46 to the inverting input terminal 47a of a fourth operational amplifier 47. The operational amplifier 47 further has a non-inverting input terminal 47b and a signal output terminal 47c. In the preferred embodiment, the operational amplifier 47 is also of an LM 324 type. The non-inverting input terminal 47b of the operational amplifier 47 is connected by means of a resistor 48 to the 12 volt output terminal 30e of the DC power supply 30 and is also connected by means of a resistor 49 to the common reference buss 100. The inverting input terminal 47a of the operational amplifier 47 is also connected by means of a capacitor 50 to the common reference buss 100.

The signal output terminal 47c of the operational amplifier 47 is connected by means of a resistor 52 to the base 53b of an npn transistor 53. The transistor 53 further has an emitter (e) directly connected to the common reference buss 100 and a collector (c) directly connected to the 24 volt output terminal 30d of the DC power supply 30. The collector (c) of the transistor 53 is also connected by means of a resistor 54 in series with the light emitting diode 16 to the common reference buss 100 and is also directly connected to a signal output terminal 60 of the electronic energy saving control circuit 10B. The output terminal 60 is directly connected to the line switching relay 10A by means of the conductor 12.

The 24 volt DC output terminal 30d of the DC power supply 30 is also directly connected to a second output terminal 61 of the electronic energy saving control circuit 10B which is directly connected by means of the conductor 11 to energize the line switching relay 10A. The room occupancy status detector circuit 10C is illustrated at the left of FIG. 3 and includes a light emitting source comprising a light emitting diode 70 in the preferred embodiment having its cathode connected to the common reference buss 100 and its anode connected by means of a resistor 71 to the 24 volt output terminal 30d of the DC power supply 30. A light sensitive Darlington transistor pair 72 is mounted adjacent the light emitting diode 70, with the light emitting diode 70 and the photosensitive transistor pair 72 being disposed on opposite sides of the keyway of the receptor channel member 17, such that the photosensitive base area of the transistor 72 is disposed to normally receive the light emitted by the light emitting diode 70 when the diode 70 is energized. The relative orientation of the light emitting diode 70 and the photosensitive transistor 72 is such that when a guest room key is acceptably received by the receptor channel 17, the inserted room key 18 blocks the light path from the diode 72 to the transistor 72, removing energization drive from the photosensitive transistor 72 (see FIG. 4). The photosensitive transistor 72 has a photosensitive base region (b) an output emitter (e) which is directly connected to the reference buss 100 and a collector (c) which is connected by means of a resistor 74 to the 12 volt output terminal 30e of the DC power supply 30.

OPERATION OF THE PREFERRED EMBODIMENT

The electronic energy saving control means of this invention provides a simple, efficient, reliable, cost effective and easy to install method of saving energy in the operation of room heating/cooling units. As above described, the apparatus of this invention is particularly suitable for use in combination with heating/cooling units of the type employed in hotel and motel guest rooms for controlling the air temperature and/or quality within that particular room. The energy saving control means of this invention can be rapidly installed to become cooperatively operable with any pre-installed heating/cooling units of existing hotels and motels, as well as with new such installations. The electronic control circuit 10B and the room occupancy status detector means 10C portions of the invention, both housed within the desk unit 13 are entirely portable and can be positioned at any convenient location within the room. The only alteration that need be made to the existing heating/cooling unit is the attachment of the line switching means 10A of the present invention thereto, and the operative connection of one or more of the load energizing bus lines L1 and L2 to the line switching means 10A for controllably interrupting the thermal energization path to the heating/cooling unit load 21. The electronic circuits within the desk unit 13 are conveniently energized by means of the conductors 14 and 15 which may be connected to any existing 115 volt wall outlet within the room. The only connection required between the desk unit 13 and the line switching means 10A is conveniently provided by the two conductors 11 and 12 which can be disposed within the room in an inconspicuous manner.

The energy saving means of this invention is configured to override the normal operation of the heating/cooling unit of the room whenever the room is not actively occupied, in a manner so as to cause the heating/cooling unit to become operable in an energy saving mode of operation. For example, when the thermostat 24 of the heating/cooling unit is set during colder weather to provide heat within the comfort range to the room, the energy saving control means will cause the heating/cooling unit to heat the room only to a relatively low temperature (for example 50°-55° F.) when the room is unoccupied, regardless of what the temperature setting on the heating/cooling unit thermostat 24 calls for. Conversely, when the thermostat 24 of the heating/cooling unit is set during warm weather to provide air conditioning comfort temperatures to the room, the energy saving control means will override the preset thermostat control 24 setting of the heating/cooling unit when the room is unoccupied, to prevent cooling of the room below an upper predetermined threshold temperature level (for example 80°-90° F. in the preferred embodiment). By preventing heating or cooling of the room by the heating/cooling unit 20 to its preset thermostat control setting when the room is unoccupied, significant energy savings in the operation of the heating/cooling unit 20 can be achieved. When the composite energy savings for each of the rooms within a large hotel/motel are combined, tremendous energy savings in the operating expenses for heating and cooling of the hotel or motel are accomplished.

With the present invention, a positive occupancy detector apparatus 10C must be employed to assure that the energy saving control means 10 is truly responsive to the active occupancy status of the room. Accordingly, the room occupancy status detector 10C responds only to insertion therein of a uniquely detectable and recognizable activating member 18. The activating member is preferably a uniquely identifiable member such as a guest room key which can be cooperatively accepted by the receptor station or channel 17 and one which is normally always carried by the room occupant and is removed from the room when the occupant is not within the room. Typical of such activator members would be the guest room keys, the room identifier tab or plate typically attached to such keys, a uniquely identifiable card which would be carried by the room occupant, or the like. Such activating members 18 could be configured in whole or in part of uniquely identifiable materials which would be detected by the detector apparatus 10C. In a preferred embodiment, the activating member comprises the guest room key which is matingly received within the receptor channel 17 of the desk unit 13. The presence of the activating key member 18 within the receptor channel 17 is detected in the preferred embodiment by means of the photosensitive circuit combination comprising the light emitting diode 70 and the photosensitive transistor 72.

Referring to FIG. 3, the light emitting diode 70 is normally operatively energized by means of the power supply 30 to provide incident light upon the photosensitive transistor 72, causing operative saturation of the transistor 72 and providing a logical low signal at its collector 72c. This logical low signal is directly applied to the non-inverting input terminal 43b of the operational amplifier 43 which acts as a differential amplifier circuit. Upon insertion of the activating key member 18 into the receptor channel 17, the light path from the light emitting diode 70 to the photosensitive transistor 72 is interrupted, de-energizing the transistor pair 72 and causing the signal at the collector 72c of the transistor 72 to rise to a logical high.

When the activating key member 18 is not inserted within the receptor channel 17, the energy saving control circuit 10B is operative in its energy saving mode of operation to override control of the heating/cooling unit load 21 by means of the temperature control unit 24. In this mode of operation, the temperature sensing portion of the electronic control circuit 10B operatively provides the control functions in lieu of the normal temperature control thermostat 24 for energizing the heating/cooling unit load 21.

Referring to FIG. 3, the operational amplifiers 33 and 37 with associated components, the resistors 35, 32 and 40, the potentiometers 34 and 39 and the thermistor 42 provide the temperature sensing and monitoring functions of the energy saving control circuit 10B in an economical, highly efficient and reliable manner. Basically, the temperature sensing and switching functions are based upon a given predetermined temperature trip point and are accomplished by comparing the voltage developed across the thermistor 42 with a reference voltage established by means of the potentiometers 34 and 39 by use of the operational amplifiers 33 and 37 acting as comparitor networks. The thermistor 42 and the resistor 32 provide a voltage divider circuit having a resistance varying with temperature. As the temperature increases, the effective resistance of the thermistor drops and the resultant voltage levels applied to the non-inverting input terminal 33a and to the inverting input terminal 37a of the comparitor amplifiers 33 and 37 respectively also drops. The voltage levels at the inverting input terminal 33b of the comparitor amplifier 33 and at the non-inverting input terminal 37b of the comparitor amplifier 37, however, are fixed at preset voltage levels by means of the potentiometers 34 and 39 respectively.

The comparitor amplifier 37 is operable to provide an output signal which will cause energization of the line switching relay 10A when the measured ambient temperature applied to the thermistor 42 reaches the upper preset threshold value of the energy saving temperature range. In a preferred embodiment, the upper threshold temperature of the energy saving temperature range is 85° F. Therefore, the voltage applied to the non-inverting input terminal 37b of the comparitor amplifier 37 is preset such that when the ambient temperature reaches 85° F., the voltage levels applied to the inverting and non-inverting input terminals 37a and 37b respectively of the comparitor amplifier 37 will be approximately equal, with further temperature increases causing the voltage level at the inverting input terminal 37a to drop below the preset voltage level applied to the non-inverting input terminal 37b. When this occurs, the voltage level at the signal output terminal 37c of the comparitor amplifier 37 will rise to a positive level, providing a positive input signal to the inverting input terminal 47a of the comparitor amplifier 47. The voltage level applied to the non-inverting input terminal 47b of the comparitor amplifier 47 is preset to a lower voltage level than the above described positive level applied to the inverting input terminal 47a, causing the output signal applied to the output terminal 47c of the comparitor amplifier to drop to a logical low, deactivating the transistor 53. De-energization of the transistor 53 causes the voltage level at its collector 53c to rise, de-energizing the normally energized relay coil 10A1 of the line switching relay 10A, closing the circuit path to the heating/cooling unit load 21. Therefore, when the ambient air temperature measured by the temperature sensing portion of the energy control circuit 10B rises above the upper threshold level of the energy saving temperature range, the energizing circuit path to the heating/cooling unit load 21 will be completed, causing activation of the air conditioning compressor for cooling the room. It will be noted that unless the preset temperature of the thermostat 24 is set at a level above the upper energy saving threshold temperature, the relay coil 25a of the temperature control unit 24 will simultaneously be energized to operatively complete the energizing path from the load supply terminals 26 and 27 to the load 21.

As the room cools under influence of the energized heating/cooling unit, the ambient air temperature applied to the thermistor 42 will cuase an effective increase in the thermistor resistance, causing the voltage applied to the inverting input terminal 37a of the comparitor amplifier 37 to rise until the voltage level at the inverting input terminal 37a exceeds the voltage level applied to the non-inverting input terminal 37b, thus reversing the process, causing energization of the line switching relay coil 10A1, to open the energization path to the heating/cooling unit load 21. The feedback resistor 38 of the comparitor amplifier 37 circuit provides hysteresis after the amplifier 37 has switched states, by altering the voltage applied to the non-inverting input terminal 37b of the amplifier 37 in the direction to further enhance the last switched state. In the preferred embodiment, sufficient hysteresis is provided by the feedback resistor 38 to cause the comparitor amplifier 37 to remain in its logical high output energization state until the ambient air temperature applied to the thermistor 42 has dropped to 80° F. (i.e. the feedback resistor 38 provides a 5° F. hysteresis adjustment in the preferred embodiment). When the ambient air temperature drops below 80° F., the logical state of the comparitor amplifier 37 will switch, causing a logical low level to be applied to the inverting input terminal 47a of the comparitor amplifier 47, resulting in energization of the output transistor 53 and resultant energization of the relay coil 10A1, thus opening the energization passed to the heating/cooling unit load 21.

The comparitor amplifier 33 is operable to provide an output signal which will cause energization of the line switching relay 10A when the measured ambient temperature applied to the thermistor 42 falls below the lower preset threshold temperature value of the energy saving temperature range. In a preferred embodiment, the lower threshold temperature of the energy saving temperature range is 50° F. Therefore, the voltage applied to the inverting input terminal 33b of the comparitor amplifier 33 is preset such that when the ambient air temperature reaches 50° F., the voltage levels applied to the inverting and non-inverting input terminals 33b and 33a respectively of the comparitor amplifier 33 will be approximately equal, with further temperature decreases in the ambient air causing the voltage level at the non-inverting input terminal 33a to rise above the preset voltage level applied to the inverting input terminal 33b. When this occurs, the logical state of the comparitor amplifier 33 switches, causing the amplifier 33 to provide a positive output voltage level, providing a positive input signal to the inverting input terminal 47a of the comparitor amplifier 37. As above described, the signal output from the comparitor amplifier 47 will cause de-energization of the transistor 53, de-energizing the normally energized relay coil 10A1 of the line switching relay 10A, closing the circuit path to the heating/cooling unit load 21. Therefore, when the ambient air temperature measured by the temperature sensing portion of the energy control circuit 10B falls below the lower threshold temperature level of the energy saving temperature range, the energizing circuit path to the heating/cooling unit load 21 will be completed, causing activation of the heating coil load for providing heat to the room. It will be noted that unless the preset temperature of the thermostat 24 is set at a level below the lower energy saving threshold temperature, the relay coil 25a of the temperature control unit 24 will simultaneously be energized to operatively complete the energizing path from the load supply terminals 26 and 27 to the load 21.

As the room temperature rises under influence of the energized heating coil load 21, the ambient air temperature applied to the thermistor 42 will cause an effective decrease in the thermistor resistance, causing the voltage applied to the non-inverting input terminal 33a of the comparitor amplifier 33 to fall until the voltage level at the non-inverting input terminal 33a is less than the voltage level applied to the inverting input terminal 33b, thus reversing the process, causing energization of the line switching relay coil 10A1, to open the energization path to the heating/cooling unit 21. As was previously described with respect to the feedback resistor 38, the feedback resistor 36 associated with the comparitor amplifier 33 provides a hysteresis factor which prevents re-tripping of the comparitor amplifier 33 as the room heats, until the ambient air temperature has attained approximately 55° F. The hysteresis factors provided by the feedback resistors 36 and 38 prevent excessive cycling and chattering of the line switching relay 10A.

While specific upper and lower threshold temperatures are described with respect to the preferred embodiment of the electronic energy saving control network, it will be understood that the upper and lower limits of the energy saving temperature range can be reset by means of the potentiometers 34 and 39 to any desired range of consecutive temperature degrees. It will generally be understood that the comfort range of degrees associated with the thermostat temperature control 24 of the heating/cooling unit will be significantly narrower and generally included within the more broad energy saving temperature range provided by the electronic energy saving control circuit 10B. It should also be noted that while operational amplifier comparitor circuits have been employed within preferred embodiment for providing the temperature sensing control functions, other logical or mechanical switching mechanisms could equally well be employed to provide this function within the spirit and intent of this invention. The advantages of performing the temperature sensing and monitoring functions by means of electronic control networks over their mechanical or electromechanical counterparts are lower cost, higher realiability, and greater flexibility in end use applications of the system. For example, if mercury switching thermostat temperature sensors are employed, the physical orientiation of the thermostat unit must be carefully controlled to insure proper setting of the mercury switching members within the controlled environment. Such a unit would not typically lend itself to convenient mounting within portable desk units such as the desk valet 13, but would generally require more permanent installation upon a wall or relatively stationary member within the room. However, such mechanical or electromechanical units are included within the spirit and intent of this invention. Also it will be understood that the energy saving control circuit could equally well be configured to control a relay 10 of a type which is normally operative to open the circuit path to the unit 20 when the relay coil 10A1 is normally deenergized.

The electronic energy saving control circuit is operable as above described to override the temperature control unit 24 of the heating/cooling units 20 only as long as the uniquely detectable insertable member 18 has not been acceptably received by the room occupancy status detector apparatus 10C. When a guest enters the room he can override the temperature sensing and monitoring portion of the electronic energy saving control circuit 10B by insertion of his detectable activation member into the receptor station 17, to restore control of the heating/cooling unit load 21 back to the temperature control unit or thermostat 24 of the heating/cooling unit 20. Upon insertion of the detectable member 18 into the receptor station 17 of the desk unit 13, the photosensitive transistor pair 72 provides a logical high signal as previously described to the non-inverting input terminal 43b of the comparitor amplifier 43. The voltage level thus applied to the non-inverting input terminal 43b of the amplifier 43 will exceed the pre-set bias applied to the inverting input termianl 43a of the amplifier 43 causing the amplifier 43 to switch logical states to provide a logical high signal to the inverting input terminal 47a of the comparitor amplifier 47, resulting in continuous deactivation of the normally energized relay coil 10A1 of the line switching means 10A, causing full power to be applied to the heater/cooler unit 20. Application of the full power to the heating/cooling unit 20 enables the temperature control unit or thermostat 24 thereof to regulate the ambient air temperature of the room to a temperature falling within the comfort temperature range centering about the median temperature selected by the room occupant on the thermostat 24. Therefore, as long as the detectable member inserted by the room occupant remains inserted within the room occupancy detector 10C (which is presumably as long as the occupant remains within the room), the ambient room temperature will be maintained within a comfort temperature range of degrees of the temperature selected by the room occupant. The occupant, therefore, has complete control over the room temperature as long as he remains within the room so that he can select that temperature range which is most desirable to him.

Upon leaving the room, the occupant removes the detectable member 18 from the receptor station 17 of the desk chassis 13, automatically re-establishing control of the heating/cooling unit load 21 under direction of the electronic energy saving control circuit. Since the majority of the active room occupancy by hotel and motel guests is typically significantly less than the hours of non-active occupancy of each respective room, significant energy savings can be achieved by means of the energy saving room control unit of this invention by controlling preparation of the heating/cooling unit within a relatively broad energy saving temperature range whenever the hotel or motel room is not actively occupied.

While the invention has been described with respect to a "two sided" energy saving temperature range having an upper threshold temperature value significantly higher than the normal comfort range setting and a lower threshold temperature value significantly lower than the normal comfort range setting, it will be understood that the principles of this invention apply equally well to situations wherein the energy saving control means would be employed to control energization of only one type of load element, for example either an air conditioner compressor lead or a heater element. In such cases the energy saving temperature range need not extend both below and above the normal comfort temperature setting, but need extend relative to the normal comfort range only in the direction which would represent an energy savings control function in the specific application. In such specialized instances, the electronic energy saving control circuit can also be simplified to include only one of the temperature sensing circuit means.

While we have disclosed a preferred embodiment description and application of the invention, other modifications of the invention not specifically disclosed or referred to will be apparent to those skilled in the art in light of the foregoing description. This description is intended to provide concrete examples of a preferred embodiment structure and application clearly disclosing the present invention and its operative principles. Accordingly, the invention is not limited to any particularly embodiment or configuration of component parts thereof. All alternatives, modifications and variations of the present invention which fall within the spirit and broad scope of the appended claims are covered.

What is claimed is:

1. A method of conserving electrical energy in heating and cooling a room having an individual heating and cooling unit load normally energized from an electrical power source to maintain the ambient room air temperature within a selectable comfort temprature range, comprising the steps of:
    a. sensing the ambient air temperature within a room and providing a variable electronic output signal responsive thereto;
    b. electronically determining in response to said variable electronic output signal whether the sensed air temperature is within a predetermined energy saving range of consecutive temperature degrees and selectively providing an interrupt control signal in response thereto;
    c. automatically electrically preventing in response to said interrupt control signal, energization of the heating and cooling unit load whenever said sensed ambient room air temperature is within said predetermined energy saving temperature range; and
    d. detecting the active presence of an occupant within the room by electrically sensing presence within the room of a uniquely detectable physical activating member of a type generally carried by the room occupant upon leaving the room, and overriding said energy prevention response to said interrupt control signal, to maintain the ambient air room temperature within the comfort temperature range, whenever the activating member presence is detected within the room.

2. A method of conserving electrical energy in heating and cooling a room as recited in claim 1, wherein said step of electronically determining whether the sensed air temperature is within a predetermined energy saving temperature range comprises the steps of:
    a. producing a selectable electronic reference voltage corresponding to at least one of the upper or lower temperature threshold values defining said energy saving temperature range; and
    b. electronically comparing said variable electronic output signal with said produced reference voltage to provide said interrupt control signal responsive to said comparison.

3. A method of conserving electrical energy in heating and cooling a room as recited in claim 1, wherein the step of sensing the presence of said physical activating member within the room comprises the steps of:
    a. matingly accepting said physical activating member within a receptor station;
    b. sensing the physical properties of said accepted activating member; and
    c. electrically comparing said sensed physical properties against a predetermined recognition standard for selectively providing an overriding output control signal in response thereto.

4. An energy saving override control apparatus for use in combination with room temperature control systems of the type having an air temperature control load, a power source for energizing the air temperature control load, and thermostat means for controlling energization of the air temperature control load to maintain the ambient room air temperature within a selectable comfort temperature range of degrees, said override control means comprising:

a. electrical switching means normally operatively connecting in circuit the air temperature control load with the energizing power source, responsive to receipt of an interrupt control signal for selectively electrically opening the energization path between the power source and the air temperature control load, said switching means being operable independent of the thermostat means;

b. energy saving control circuit means for monitoring the ambient room air temperature and for providing in response thereto said interrupt control signal whenever the monitored ambient room air temperature is within an energy saving range of consecutive temperature degrees, whereby said energy saving temperature range normally includes the comfort temperature range of degrees;

c. means for operatively connecting said energy saving control circuit with said electrical switching means for transfer of said interrupt control signal therebetween; and d. room occupant detector means responsive to receipt of a room occupant entered stimuli for sensing a uniquely detectable activating member of a type normally carried by a room occupant upon leaving the room and for inhibiting transfer of said interrupt control signal to said switching means in response to said sensed activating member, whereby said interrup control signal is prevented from energizing said switching means whenever said uniquely detectable activating member is sensed in real time by said detector means.

5. An energy saving override control apparatus as recited in claim 4, wherein said activating member comprises a hand carriable member such as a room key, and wherein said room occupant detector means comprises:

a. a chassis;

b. a receptor station in said chassis configured to matingly receive said hand carriable activating member; and c. a photosensitive sensor circuit mounted adjacent said receptor station in said chassis for detecting the accepted presence of said activation member by said receptor station.

6. An energy saving override control apparatus as recited in claim 5, wherein said chassis comrpises a portable desk mountable unit suitable for placement at a position remotely located from the air temperature control load.

7. An energy saving override control apparatus as recited in claim 4, wherein said energy saving control circuit means comprises:

a. temperature sensing circuit means for monitoring the ambient room air temperature and for providing a variable temperature sensed output signal in response thereto;

b. a first reference circuit for establishing a first temperature invariable reference voltage signal correlated to one of the end temperature values of said energy saving temperature range;

c. a first comparator circuit operatively connected to monitor said variable sensed output signal and said first reference voltage for providing a first comparator signal responsive thereto; and d. output circuit means responsive to said first comparator output signal for providing said interrupt control signal.

8. An energy saving override control apparatus as recited in claim 7, wherein said energy saving control circuit means further comprises:

a. a second reference circuit for establishing a second temperature invariable reference voltage signal correlated to a second of the end temperature values of said energy saving temperature range, wherein said one and said second end values comprise the opposite end temperature values of said energy saving temperature range;

b. a second comparator circuit operatively connected to monitor said variable sensed output signal and said second reference voltage for providing a second comparator output signal responsive thereto; and c. wherein said output circuit means is connected to receive said first and said second comparator output signals for providing said interrupt control signal in response thereto.

9. An energy saving override control apparatus as recited in claim 8, wherein said first reference circuit includes adjustment means for selecting said first temperature invariable reference voltage signal; and wherein said second reference circuit includes adjustment means for selecting said second temperature invariable reference voltage signal.

10. The combination with a room temperature control system of the type having thermostat means for sensing the ambient room air temperature and for controlling in response to the sensed temperature energization of a heating/cooling unit load mounted within the room to normally maintain the ambient room air temperature generally at a selectable comfort temperature setting, and an electrical power source operatively connected by the thermostat means to energize the heating/cooling unit, of an energy-saving override control apparatus, comprising:

a. temperature sensing circuit means mountable within the room for sensing the ambient room air temperature and for providing first and second output control signals in response thereto, said temperature sensor means being operable to provide said first output control signal whenever said sensed air temperature is within a predetermined energy saving range of consecutive temperature degrees and being operable to produce said second output control signal whenever said sensed air temperature is outside of said predetermined energy saving temperature range;

b. a portable activating member suitable for hand-carrying by a room occupant and of a type which is normally carried by the room occupant when he leaves the room;

c. room occupant sensor means suitable to cooperatively receive said portable activating member for providing a third output control signal whenever said activating member is cooperatively received thereby; and d. switching control means operatively mounted in circuit between the heating/cooling unit and the electrical power source and responsive to said output control signals for selectively opening and closing the energizing circuit therebetween, said switching control means being operable in response to receipt of said third output control signal to electrically close the energizing circuit path to said heating/cooling unit enabling control thereof by the thermostat means regardless of the presence of said first and said second output control signals, and being operable in the absence of said third output control signal to operatively close the energizing circuit path to said heating/cooling unit in response to receipt of said second output control signal and to electrically open the energizing circuit path to said heating/cooling unit in response to receipt of said first output control signal.

* * * * *